US008896918B2

(12) United States Patent (10) Patent No.: US 8,896,918 B2
Dixon (45) Date of Patent: Nov. 25, 2014

(54) PATHOLOGY SLIDE SCANNER

(75) Inventor: Arthur Edward Dixon, Waterloo (CA)

(73) Assignee: Huron Technologies International Inc., Waterloo, Ontario (CA)

(*) Notice: Subject to any disclaimer, the term of this patent is extended or adjusted under 35 U.S.C. 154(b) by 0 days.

(21) Appl. No.: 13/699,251

(22) PCT Filed: Dec. 23, 2011

(86) PCT No.: PCT/CA2011/001401
§ 371 (c)(1),
(2), (4) Date: Nov. 20, 2012

(87) PCT Pub. No.: WO2012/083438
PCT Pub. Date: Jun. 28, 2012

(65) Prior Publication Data
US 2013/0155499 A1 Jun. 20, 2013

Related U.S. Application Data

(60) Provisional application No. 61/427,153, filed on Dec. 24, 2010.

(51) Int. Cl.
*G02B 21/26* (2006.01)
*G02B 21/00* (2006.01)
*G02B 21/36* (2006.01)
*G02B 21/06* (2006.01)

(52) U.S. Cl.
CPC .............. *G02B 21/06* (2013.01); *G02B 21/002* (2013.01); *G02B 21/367* (2013.01)
USPC ............................ 359/393; 359/368; 382/318

(58) Field of Classification Search
None
See application file for complete search history.

(56) References Cited

U.S. PATENT DOCUMENTS

| 5,548,661 | A  | * | 8/1996  | Price et al. ..................... 382/133 |
| 6,049,421 | A  | * | 4/2000  | Raz et al. ........................ 359/394 |
| 7,305,110 | B2 | * | 12/2007 | Rubbert et al. ............... 382/128 |
| 7,773,126 | B1 | * | 8/2010  | Lee et al. .................... 348/231.5 |
| 7,826,649 | B2 | * | 11/2010 | Crandall et al. .............. 382/128 |
| 2004/0114219 | A1 | * | 6/2004 | Richardson .................. 359/368 |
| 2009/0244698 | A1 | * | 10/2009 | Zust .............................. 359/368 |

* cited by examiner

Primary Examiner — Derek S Chapel
(74) Attorney, Agent, or Firm — Daryl W. Schnurr

(57) ABSTRACT

An instrument and method for scanning at least a portion of a large specimen preferably causes the specimen to move relative to a two-dimensional detector array at a constant speed. The detector array takes one image of the specimen for each line that the detector moves. A controller controls a shutter of the detector array to open to take images and to pass the images to a processor, which is preferably a computer. The instrument takes one partial image of each part of the specimen that is being scanned and then combines those images with other images to produce a contiguous image.

59 Claims, 10 Drawing Sheets

PATHOLOGY SLIDE SCANNER

BACKGROUND OF THE INVENTION

1. Field of the Invention

This invention relates to the field of microscopic imaging of large specimens with particular emphasis on brightfield and fluorescence imaging, including photoluminescence and spectrally-resolved fluorescence. Applications include imaging tissue specimens, genetic microarrays, protein arrays, tissue arrays, cells and cell populations, biochips, arrays of biomolecules, detection of nanoparticles, photoluminescence imaging of semiconductor materials and devices, and many others.

2. Description of the Prior Art

The macroscope originally described in U.S. Pat. No. 5,381,224 is a scanning-laser system that uses a telecentric laser-scan lens to provide a wide field of view. Several embodiments are presently in use. These include instruments for fluorescence and photoluminescence (including spectrally-resolved) imaging (several other contrast mechanisms are also possible), instruments in which a raster scan is provided by the combination of a scanning mirror and a scanning specimen stage, instruments in which the specimen stage is stationary and the raster scan is provided by two scanning mirrors rotating about perpendicular axes, confocal and non-confocal versions, and other embodiments. A macroscope with fine focus adjustment was described in U.S. Pat. No. 7,218,446, and versions for reflected-light, fluorescence, photoluminescence, multi-photon fluorescence, transmitted-light, and brightfield imaging were described. The combination of a scanning laser macroscope with a scanning laser microscope to provide an imaging system with a wide field of view and the high resolution capability of a microscope is described in U.S. Pat. No. 5,532,873.

When the macroscope is used for fluorescence imaging, it has several advantages. Exposure for each fluorophore can be adjusted separately without changing scan speed by changing either laser intensity and/or detector gain (in the case of a detector comprised of a photomultiplier tube (pmt) followed by a preamplifier, both the pmt voltage (which changes pmt gain) and preamplifier gain can be changed). The ability to adjust the detection gain for each fluorophore separately allows the instrument to simultaneously collect multiple fluorophore images that are all correctly exposed. In addition, the appropriate laser wavelength can be provided to excite a chosen fluorophore, and excitation wavelengths can be chosen so they do not overlap detection wavelength ranges.

Several other technologies are used for imaging large specimens at high resolution. With tiling microscopes, the image of a small area of the specimen is recorded with a digital camera (usually a CCD camera), the specimen is moved with a computer-controlled microscope stage to image an adjacent area, an image of the adjacent area is recorded, the stage is moved again to the next area, and so on until a number of image tiles have been recorded that together cover the whole area of the specimen. Images of each area (image tiles) are recorded when the stage is stationary, after waiting long enough for vibrations from the moving stage to dissipate, and using an exposure time that is sufficient to record the fluorescence images. These image tiles can be butted together, or overlapped and stitched using computer stitching algorithms, to form one image of the entire specimen. Such images may contain tiling artifacts, caused by focus changes between adjacent tiles, differences in illumination intensity across the field of view of the microscope, barrel or pincushion distortion near the edge of the tiles, and microscope objectives that do not have a flat focal plane. For large specimens, thousands of tiles may be required to image the entire specimen, increasing the chance of tiling artifacts. Tiling microscopes are very slow for fluorescence imaging as one image is taken of each tile When tiling microscopes are used for fluorescence imaging, the areas surrounding each tile and the overlapping edges of adjacent tiles are exposed twice (and the corners four times) which can bleach some fluorophores. Exposure is adjusted by changing the exposure time for each tile. If multiple fluorophores are imaged, a different exposure time is required for each, so each fluorophore requires a separate image at each tile position. Multiple exposure of the specimen for imaging multiple fluorophores can also increase bleaching. After all tiles have been collected, considerable effort (both human and computer) is required to stitch the tiles together and correct each tile for illumination intensity and collection sensitivity changes across the field of view of the microscope (correction for variations in illumination intensity and collection sensitivity is sometimes called "field flattening"). Stitching tiles together is also complicated by distortion and curvature of field of the microscope objective, which occur near the edges of the field of view (just where stitching of tiles occurs).

Strip scanning instruments are also used for imaging large specimens. In these instruments infinity-corrected microscope optics are used, with a high Numerical Aperture (high NA) microscope objective and a tube lens of the appropriate focal length to focus an image of the specimen directly on a CCD or CMOS linear array sensor or TDI sensor with the correct magnification to match the resolution of the microscope objective with the detector pixel size for maximum magnification in the digitized image {as described in "Choosing Objective Lenses: The Importance of Numerical Aperture and Magnification in Digital Optical Microscopy", David W. Piston, Biol. Bull. 195, 1-4 (1998)}. A linear CCD detector array with 1000 or 2000 pixels is often used, and three separate linear detectors with appropriate filters to pass red, green and blue light are used for RGB brightfield imaging. The sample is moved at constant speed in the direction perpendicular to the long dimension of the linear detector array to scan a narrow strip across a microscope slide. The entire slide can be imaged by imaging repeated strips and butting them together to create the final image. Another version of this technology uses linear TDI (Time Delay Integration) array sensors which increase both sensitivity and imaging speed. In both of these instruments, exposure is varied by changing illumination intensity and/or scan speed.

Such a microscope is shown in FIG. 1 (Prior Art). A tissue specimen 100 (or other specimen to be imaged) mounted on microscope slide 101 is illuminated from below by illumination source 110. Light passing through the specimen is collected by infinity-corrected microscope objective 115, which is focused on the specimen by piezo positioner 120. The microscope objective 115 and tube lens 125 form a real image of the specimen on linear detector array 130. An image of the specimen is collected by moving the microscope slide at constant speed using motorized stage 105 in a direction perpendicular to the long dimension of the detector array 130, combining a sequence of equally-spaced line images from the array to construct an image of one strip across the specimen. Strips are then assembled to form a complete image of the specimen.

For brightfield imaging, most strip-scanning instruments illuminate the specimen from below, and detect the image in transmission using a sensor placed above the specimen. In brightfield, signal strength is high, and red, green and blue channels are often detected simultaneously with separate linear detector arrays to produce a colour image.

Compared to brightfield imaging, fluorescence signals can be thousands of times weaker, and some fluorophores have much weaker emissions signals than others. Fluorescence microscopy is usually performed using illumination from the same side as detection (epifluorescence) so that the bright illumination light passing through the specimen does not enter the detector. In strip-scanning instruments, exposure is varied by changing scan speed, so present strip-scanning instruments scan each fluorophore separately, reducing the scan speed when greater exposure is required for a weak fluorophore. Varying exposure by changing scan speed makes it difficult to design a strip-scanner for simultaneous imaging of multiple fluorophores, where each channel would have the same exposure time, and present strip-scanners scan one fluorophore at a time. In addition, in fluorescence microscopy, relative intensity measurements are sometimes important for quantitative measurement, and 12 or 16 bit dynamic range may be required. For present strip scanners, this would require larger dynamic range detectors and slower scan speeds.

Before scanning a large specimen in fluorescence, it is important to set the exposure time (in a tiling or strip-scanning microscope) or the combination of laser intensity, detector gain and scan speed (in a scanning laser macroscope or microscope) so that the final image will be properly exposed in general it should not contain saturated pixels, but the gain should be high enough that the full dynamic range will be used for each fluorophore in the final image. Two problems must be solved to achieve this result—the exposure must be estimated in advance for each fluorophore and for simultaneous detection of multiple fluorophores, the exposure time must be adjusted separately for each detection channel before scanning. For strip-scanning instruments, estimating the exposure in advance is difficult without scanning the whole specimen first to check exposure, and this must be done for each fluorophore. Instead of scanning first to set exposure, many operators simply set the scan speed to underexpose slightly, with resulting noisy images, or possibly images with some overexposed (saturated) areas if the estimated exposure was not correct. For macroscope-based instruments, a high-speed preview scan can be used to set detection gain in each channel before final simultaneous imaging of multiple fluorophores (see WO2009/137935, "Imaging System with Dynamic Range Maximization").

A prior art scanning microscope for fluorescence imaging is shown in FIG. 2. A tissue specimen 100 (or other specimen to be imaged) mounted on microscope slide 101 is illuminated from above by illumination source 200. In fluorescence imaging, the illumination source is usually mounted above the specimen (epifluorescence) so that the intense illumination light that passes through the specimen is not mixed with the weaker fluorescence emission from the specimen, as it would be if the illumination source were below the specimen. Several different optical combinations can be used for epifluorescence illumination—including illumination light that is injected into the microscope tube between the microscope objective and the tube lens, using a dichroic beamsplitter to reflect it down through the microscope objective and onto the specimen. In addition, a narrow wavelength band for the illumination light is chosen to match the absorption peak of the fluorophore in use. Fluorescence emitted by the specimen is collected by infinity-corrected microscope objective 115 which is focused on the specimen by piezo positioner 120. Emission filter 205 is chosen to reject light at the illumination wavelength and to pass the emission band of the fluorophore in use. The microscope objective 115 and tube lens 125 form a real image of the specimen on linear TDI detector array 210. An image of the specimen is collected by moving the microscope slide at constant speed using motorized stage 105 in a direction perpendicular to the long dimension of the detector array 210, combining a sequence of equally-spaced, time-integrated line images from the array to construct an image of one strip across the specimen. Strips are then assembled to form a complete image of the specimen. When a CCD-based linear TDI array is used, each line image stored in memory is the result of integrating the charge generated in all of the previous lines of the array while the scan proceeds, and thus has both increased signal/noise and amplitude (due to increased exposure time) when compared to the result from a linear array detector. Exposure is also increased by reducing scan speed, so the scan time (and thus image acquisition time) is increased when using weak fluorophores. In addition, it is difficult to predict the best exposure time before scanning. When multiple fluorophores are used on the same specimen, the usual imaging method is to choose illumination wavelengths to match one fluorophore, select the appropriate emission filter and scan time (speed) for the chosen fluorophore, and scan one strip in the image. Then the illumination wavelength band is adjusted to match the absorption band of the second fluorophore, a matching emission filter and scan speed are chosen, and that strip is scanned again. Additional fluorophores require the same steps to be repeated. Finally, this is repeated for all strips in the final image. Some instruments use multiple linear TDI detector arrays to expose and scan multiple fluorophores simultaneously, but this usually results in a final image where one fluorophore is exposed correctly and the others are either under- or over-exposed. Exposure can be adjusted by change the relative intensity of the excitation illumination for each fluorophore, for example, by using LED illumination, which is easily adjustable. When multiple illumination bands are used at the same time, the resulting image for each fluorophore may differ from that produced when only one illumination band is used at a time because of overlap of fluorophore emission bands, and because autofluorescence from the issue itself may be excited by one of the illumination bands. Autofluorescence emission usually covers a wide spectrum and may cause a bright background in all of the images when multiple fluorophores are illuminated and imaged simultaneously.

A good description of strip scanning instruments, using either linear arrays or TDI arrays, is given in US Patent Application Publication # US2009/0141126 ("Fully Automatic Rapid Microscope Slide Scanner", by Dirk Soenksen).

Linear arrays work well for brightfield imaging, but the user is often required to perform a focus measurement at several places on the specimen before scanning, or a separate detector is used for automatic focus. Linear arrays are not often used for fluorescence imaging because exposure time is inversely proportional to scan speed, which makes the scan time very long for weak fluorophores. In addition, exposure (scan speed) must be adjusted for each fluorophore, making simultaneous measurement of multiple fluorophores difficult when they have widely different fluorescence intensity (which is common).

Linear TDI arrays and associated electronics are expensive, but the on-chip integration of several exposures of the same line on the specimen provides the increased exposure time required for fluorescence imaging while maintaining a reasonable scan speed. Simultaneous imaging of multiple fluorophores using multiple linear TDI detector arrays is still very difficult however, since each of the linear detectors has the same integration time (set by the scan speed), so it is common to use only one linear TDI array, adjusting exposure for each fluorophore by changing the scan speed and collecting a separate image for each fluorophore. Focus is set before scanning at several positions on the specimen, or automatic focus is achieved using a separate detector or focus measuring device.

DEFINITIONS AND OBJECTS OF THE INVENTION

For the purposes of this patent document, a "macroscopic specimen" (or "large microscope specimen" or "large specimen") is defined as one that is larger than the field of view of a compound optical microscope containing a microscope objective that has the same Numerical Aperture (NA) as that of the scanner described in this document.

For the purposes of this patent document, TDI or Time Delay and Integration is defined as the method and linear detectors used for scanning moving objects, usually consisting of a linear CCD-based detector array in which charge is transferred from one row of pixels in the detector array to the next in synchronism with the motion of the real image of the moving object. As the object moves, charge builds up and the result is charge integration just as if a longer exposure was used in a stationary imaging situation. When the image (and integrated charge) reaches the last row of the linear array, that line of pixels is read out. In operation, the last line of the moving image is read out continuously, one row of pixels at a time. One example of such a camera is the linear DALSA Piranha TDI camera.

For the purposes of this patent document the term "image acquisition" includes all of the steps necessary to acquire and produce the final image of the specimen, including some of but not limited to the following: the steps of preview scanning, instrument focus, predicting and setting gain for imaging each fluorophore, image adjustments including scan linearity adjustment, field flattening (compensating for fluorescence intensity variation caused by excitation intensity and detection sensitivity changes across the field of view), correction of fluorescence signal in one channel caused by overlap of fluorescence from adjacent (in wavelength) channels when two or more fluorophores are excited simultaneously, dynamic range adjustment, butting or stitching together adjacent image strips (when necessary), storing, transmitting and viewing the final image.

For the purposes of this patent document, the term "image processing" means all of the steps required to process the data to prepare the final image file, including some of but not limited to the following: the steps of scan linearity adjustment, field flattening, correction for crosstalk when simultaneously scanning multiple fluorophores, correcting fluorescence image data by subtracting fluorescence originating from the glass of the microscope slide, subtracting the dark-current noise floor from the detector, and contracting the dynamic range of the image data to match the (smaller) dynamic range of the final image.

"Proper exposure" is defined as a gain setting such that in the output image file, no (or only a small number of) pixels are saturated, and the dynamic range of the image data matches the dynamic range of the output image file (8 bits for an 8 bit file, 12 bits for a 12 bit file, etc.) and includes substantially the entire range of pixel amplitudes from the noise floor to the brightest pixel. The output image file may have a smaller dynamic range than that of the detection system, and that of an intermediate image file that is collected during scanning. WO2009/137935 describes two methods of maximizing the dynamic range of data stored in the output image file—(1) accurately estimating the gain required to maximize the dynamic range of each detection channel when the dynamic range of the detection channel and the dynamic range of the output image data file are the same, and (2) using a dynamic range in the detection channel that is larger than that required in the final image data file and contracting the acquired data to utilize substantially the entire dynamic range of the final image data file.

For the purposes of this patent document, the term "sparse image" or "sparse pixel image" means an image in which only pixels in a sparse grid exist in the image—e.g. one pixel at the centre of a square area of the image that would normally contain 100 or more pixels. The pixel values (intensities) are the same as they would be in the complete image, and do not reflect in any way the values of the pixels that were discarded (or not measured) to produce the sparse image.

For the purposes of this patent document, a "frame grabber" is any electronic device that captures individual, digital still frames from an analog video signal or a digital video stream or digital camera. It is often employed as a component of a computer vision system, in which video frames are captured in digital form and then displayed, stored or transmitted in raw or compressed digital form. This definition includes direct camera connections via USB, Ethernet, IEEE 1394 ("FireWire") and other interfaces that are now practical.

OBJECTS OF THE INVENTION

It is an object of this invention to provide a method of using a CCD or CMOS or other technology two-dimensional sensor array for imaging moving objects instead of using linear array or linear TDI (time delay and integration) line scan technology.

It is an object of this invention to provide an instrument and method of scanning large microscope specimens on a moving microscope stage using one or more CCD or CMOS or other technology two-dimensional sensor arrays in place of linear arrays or TDI arrays. The CCD or CMOS or other technology two-dimensional sensor arrays are described in the claims of the application as two-dimensional area detector arrays to differentiate them from linear arrays or TDI arrays. The two-dimensional area detector arrays have a length and a width, either of which are referred to as an edge dimension.

It is an object of this invention to provide an imaging system for large microscope specimens using one or more CCD or CMOS or other technology two-dimensional sensor arrays whereby noise in the image is reduced by adding together a sequence of overlapping images on a line-by-line basis, whereby each line of the final image is the result of adding several exposures of the same line, thus increasing the exposure time for that line in the image.

Each line in the final image is the result of adding several exposures of the same line and then dividing by the number of exposures, or adding the data from each exposure to a data set with a larger dynamic range, e.g. one could add 256 images from an 8-bit detector into a 16-bit image store. Then, dynamic-range contraction can be used on each fluorophore image to fill the dynamic range required in the output file for each fluorophore, as described in WO2009/137935.

It is an object of this invention to provide a method of scanning large microscope specimens on a moving microscope stage using one or more CCD or CMOS or other technology two-dimensional sensor arrays in place of linear arrays or TDI arrays that allows simultaneous imaging of multiple fluorophores, even where there is a large difference in the signal strength of the different fluorophores. For example, consider an 8-bit sensor array (or an array in which the 8 most-significant bits are commonly read out) and a 16-bit image store for each fluorescence detection channel. Up to 256 8-bit measurements can be added to each pixel in the 16-bit image store, and, if desired, the resulting 16-bit image can be contracted back to 8 bits, using the contraction methods described in WO2009/137935. Contraction can be different for each fluorescence channel so that the resulting 8-bit image from each channel fills the 8 bit dynamic range commonly available for viewing each colour.

It is an object of this invention to provide a fluorescence imaging system for large microscope specimens using CCD or CMOS or other technology two-dimensional sensor arrays in place of linear arrays or linear TDI arrays whereby the dynamic range of the instrument is larger than the dynamic range of the detector. (e.g. using an 8-bit detector, adding together 256 8-bit images results in a final image with a dynamic range of 16 bits.)

It is an object of this invention to provide a fluorescence imaging system for detecting multiple fluorophores in large microscope specimens using CCD or CMOS or other technology two-dimensional sensor arrays in place of linear arrays or linear TDI arrays whereby the dynamic range of the acquired data in each of the separate fluorescence images (one from each fluorophore) can be contracted to fill (or substantially fill) the entire dynamic range of the output image data file for each fluorophore. (See WO2009/137935 for examples of image data dynamic range contraction.) The TDI arrays are said to be linear because each line of data is passed downward to a bottom of the TDI array and then transferred out from the bottom line of the array.

It is an object of this invention using CCD or CMOS or other technology two-dimensional sensor arrays in place of linear arrays or linear TDI arrays to provide a method of acquiring fluorescence images in which the image data from each fluorophore substantially fills the dynamic range available in the final image file, by estimating the gain required to maximize the dynamic range for each fluorophore in a fluorescence image before scanning, using detection channels that have larger dynamic range than that required in the final image, and contracting the dynamic range of the acquired data to fill substantially the entire dynamic range of the output image data file for each fluorophore.

It is an object of this invention using CCD or CMOS or other technology two-dimensional sensor arrays in place of linear arrays or linear TDI arrays to provide a fluorescence imaging system for macroscopic specimens in which the correct gain setting for fluorescence imaging can be estimated from a preview scan of the entire specimen (or part of the specimen) before the final scan is started. (For example, a sparse pixel image can be created from a high speed preview scan)

It is an object of this invention using CCD or CMOS or other technology two-dimensional sensor arrays in place of linear arrays or linear TDI arrays to provide a fluorescence imaging system for macroscopic specimens in which the correct gain setting for each fluorophore detection channel when simultaneously imaging multiple fluorophores can be estimated from a preview scan of the entire specimen (or part of the specimen) before the final scan is started. (sparse pixel images can be created from each detection channel)

It is an object of this invention to provide an imaging system for imaging specimens containing fluorescent nanoparticles using CCD or CMOS or other technology two-dimensional sensor arrays in place of linear arrays or linear TDI arrays in which the correct gain setting for fluorescence imaging can be estimated from a preview scan of the entire specimen (or part of the specimen) before the final scan is started.

It is an object of this invention using CCD or CMOS or other technology two-dimensional sensor arrays in place of linear arrays or linear TDI arrays to provide a method of using the data stored in the image histogram during scanning to contract the dynamic range of the image data file after scanning is complete, and to provide a method of performing such contraction either manually or automatically on the stored images of scan strips before the final image is assembled. This operation can be performed in the background while scanning of the next strip is underway (but all strips must be contracted equally).

It is an object of this invention using CCD or CMOS or other technology two-dimensional sensor arrays in place of linear arrays or linear TDI arrays to provide a method of using the preview image histogram to provide a method of performing dynamic range contraction and other image processing operations on the data stream during scan, such that the image being stored during scan has already been contracted to the dynamic range required in the output image file, and required image processing operations have been completed during scan.

It is an object of this invention using CCD or CMOS or other technology two-dimensional sensor arrays in place of linear arrays or linear TDI arrays to provide a means and method for fluorescence imaging of genetic, protein or tissue microarrays.

It is an object of this invention using CCD or CMOS or other technology two-dimensional sensor arrays in place of linear arrays or linear TDI arrays to provide a means and method for fluorescence imaging of microarrays, in which the correct gain setting and dark current offset can be estimated from a high-speed preview scan of the entire specimen or part of the specimen.

It is an object of this invention using CCD or CMOS or other technology two-dimensional sensor arrays in place of linear arrays or linear TDI arrays and the scanning microscope described in FIG. 3 or FIG. 7 to provide a means and method for acquiring an image of the entire specimen which can be used as an index image, followed by acquisition of single field-of-view images at one or several positions on the specimen, where such single field-of-view images are acquired while the stage is stationary. These single field-of-view images can be either brightfield or fluorescence, and allow the operator to view changes in the specimen as a function of time. Video-rate acquisition enables these changes to be viewed in real time. Increased exposure of single field-of-view fluorescence images can be accomplished by increasing the time the shutter is open, or by adding a series of images of the same field-of-view (which also allows the dynamic range in the image to be larger than that of the detector array). Increased optical resolution can be achieved in the single field-of-view images using structured illumination (see "Widefield fluorescence microscopy with extended resolution" by A Stemmer, M Beck & R Fiolka, Histochem Cell Biol 130 (807-817) 2008). Optical sectioning can be accomplished in the single field-of-view images by injecting a laser beam into the tube of the microscope through a diffuser plate, which is imaged onto the back aperture of the objective (or by simply illuminating the specimen directly). Two images can be acquired, one illuminated by speckle when the diffuser plate is stationary, and a second uniform-illumination image when the diffuser plate is in rapid motion. These two images can be processed and combined to give a final optically-sectioned high resolution image, as described in "Wide-field fluorescence sectioning with hybrid speckle and uniform-illumination microscopy" by D. Lim, K. Chu & J. Mertz, Optics Letters 33 (1819-1821) 2008.

It is an object of this invention using CCD or CMOS or other technology two-dimensional sensor arrays to provide a slide-scanner instrument and method for brightfield imaging of large specimens mounted on microscope slides using a single two-dimensional sensor array in which the array is divided into thirds, with one third covered with a red transmission filter, one with a green transmission filter, and one with a blue transmission filter, in which each third of the detector acquires a strip image and the three images can be combined digitally to produce an ROB brightfield image.

It is an object of this invention using CCD or CMOS or other technology two-dimensional sensor arrays to provide a slide scanner instrument and method for fluorescence imaging of large specimens containing multiple fluorescent dyes or other sources of fluorescence mounted on microscope slides using a single two-dimensional sensor array in which the array is divided into fractions, one for each fluorescent source, with each section covered with a transmission filter that transmits the emission peak of one of the fluorescent dyes or sources, in which each fraction of the detector acquires a strip image and the multiple strip images can be combined digitally to produce a single fluorescence image (which may be presented as a false colour image) or each image can be viewed separately.

It is an object of this invention using CCD or CMOS or other technology two-dimensional sensor arrays and a tunable filter to provide a multi-spectral fluorescence slide scanner and method for imaging large specimens mounted on microscope slides.

SUMMARY OF INVENTION

An instrument for scanning at least a portion of a large specimen, comprises an imaging device, the specimen being supported on a specimen holder, the holder being movable at a constant velocity relative to a two dimensional detector array in a direction perpendicular to an edge dimension of said detector array. The detector array is configured to receive data from the specimen through the imaging device when a shutter of the detector array is open and to pass data to a processor when the shutter is closed, the detector array having N lines a distance X apart, the holder and the specimen being movable relative to the detector array by successive distances of X on the detector array and corresponding distances of Y on said specimen. The shutter is controllable by a controller to open briefly and to close within each incremental distance X that the detector array moves relative to the specimen the shutter being controllable to repeatedly open and close numerous times for each image strip taken of the specimen. There are a sufficient number of image strips taken to enable said specimen to be at least partially scanned so that each part of said specimen being scanned is exposed to said detector array N times resulting in N images being taken for each part of said specimen being scanned, said processor being programmed to add together data for all N for each line in the image strip for part of said specimen being scanned and to assemble the resulting image strips for all parts of the specimen being scanned in order to produce a contiguous image of said portion of said specimen being scanned.

An instrument for scanning a large specimen, said instrument comprising an imaging device, said specimen being supported on a movable stage, said stage being movable at a constant velocity relative to a two dimensional detector array in a direction perpendicular to an edge dimension of said detector array, said detector array being configured to receive data from said specimen through said imaging device when a shutter of said detector array is open and to pass data to a processor when said shutter is closed, said detector array having N lines a distance X apart, said stage and said specimen being movable relative to said detector array by successive distances of X on said detector and corresponding distances of Y on said specimen, said shutter being controllable by a controller to open briefly and to close within each incremental distance X that the detector array moves relative to said specimen, said shutter being controllable to repeatedly open and close numerous times for each image strip taken of said specimen, there being a sufficient number of image strips taken to enable said specimen to be completely scanned so that each part of said specimen is exposed to said detector array N times resulting in N images being taken for each part of said specimen, said processor being programmed to add together data for all N exposures for each line in the image string of each part of said specimen and to assemble the resulting image strips for all parts of the specimen in order to produce a contiguous image of said specimen.

The instrument has a means for acquiring an image of an entire specimen which can be used as an index image, followed by acquisition of single-field-of-view images at one or several positions on the specimen, said instrument being capable of acquiring said single-field-of-view images while said stage is stationary, said images being one of brightfield or fluorescence images. The single-field-of-view images can be single exposures or multiple exposures (video images) that enable changes in the specimens to be viewed as a function of time, including real time.

A method of scanning at least a portion of a large specimen using an instrument comprising an imaging device having at least one lens, a support for said specimen, a two dimensional detector array and a processor, said stage and said specimen being movable relative to said detector array, said method comprising moving said stage and said specimen at a constant velocity relative to said detector array in a direction perpendicular to a long dimension of said detector array, configuring said detector array to receive data from said specimen through said imaging device when a shutter of said detector array is open and to pass data to said processor when said shutter is closed, said detector array having N lines a distance X apart, moving said stage and said specimen relative to said detector array by successive distances of X on said detector and distances of Y on said specimen for each line of said detector array, operating a controller to briefly open and close said shutter within each incremental distance X that said detector array moves relative to said specimen and corresponding incremental distance Y on said specimen, controlling said shutter to repeatedly open and close numerous times for each image strip of said specimen, taking a sufficient number of image strips to enable said specimen to be at least partially scanned so that each part of said specimen that is being scanned is exposed to said detector array N times resulting in N images being taken for each part of said specimen, programming said processor to add together data for all N exposures of each line in the single strip for each part of said specimen being scanned and to assemble the resulting image strips for all of the parts of at least said portion of the specimen being scanned in order to produce a contiguous image of at least said portion of said specimen being scanned.

An instrument for scanning at least a portion of a large specimen, said instrument comprising an imaging device, said specimen being supported on a movable stage, said stage being movable at a constant velocity relative to a two dimensional detector array in a direction perpendicular to an edge dimension of said detector array, said detector array being configured to receive data from said specimen through said imaging device when a shutter of said detector array is open and to pass data to a processor when said shutter is closed, said detector array having N lines a distance X apart, said stage and said specimen being movable relative to said detector array by successive distance of MX on said detector and corresponding distances of MY on said specimen, said shutter being controllable by a controller to open briefly and to close within each incremental distance MX that said detector array moves relative to said specimen, said shutter being controllable to repeatedly open and close numerous times for each image strip taken of said specimen, there being a sufficient number of image strips taken to enable said specimen to be at least partially scanned so that each part of said specimen being scanned is exposed to said detector array N/M times resulting in N/M images being taken for each part of said specimen being scanned, said processor being programmed to add together all of the images taken for all parts of the specimen and to assemble the resulting image strips in order to produce a contiguous image of said portion of said specimen being scanned; where M is a positive integer, the time in which the shutter is open or closed is unchanged, and the velocity of the moving stage has been increased by a factor of M, whereby a high-speed preview scan is accomplished.

An instrument for scanning at least a portion of a large specimen, said instrument comprising an imaging device, said specimen being located on a support, said specimen being movable relative to a two-dimensional detector array in a direction perpendicular to an edge dimension of said detector array, said detector array being configured to receive data from said specimen through said imaging device when a shutter of said detector array is open and to pass data to a processor when said shutter is closed, said detector array having N lines, said detector array being controlled to take a series of images on a line-by-line basis as said specimen moves relative to said detector array when a shutter is open and to pass data of said images to said processor when said shutter is closed, said processor being programmed to add all of the data for all of the images together and to assemble the resulting images strips to produce a contiguous image of at least said portion being scanned.

An instrument for alternatively scanning and stationary imaging of at least a part of a specimen in combination comprises an optical train to focus light from the specimen onto a two dimensional area detector array. The detector array is part of the optical axis, there being a holder for the specimen. The holder moves relative to the detector array during scanning and is perpendicular to the optical axis of the instrument during scanning. The holder is fixed relative to the detector array during stationary imaging of the specimen.

DESCRIPTION OF THE INVENTION

Figure 1:
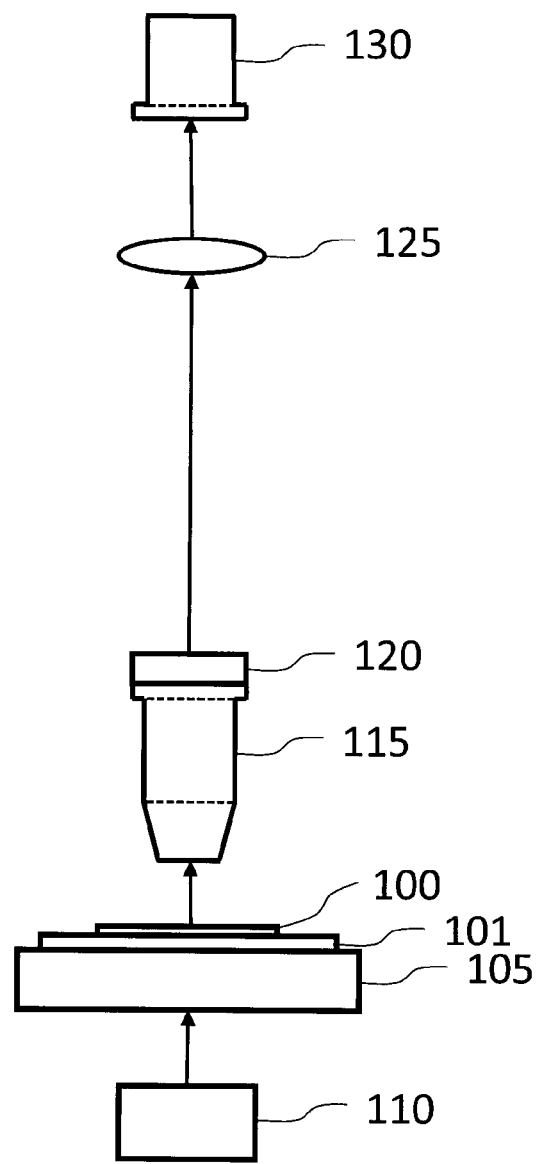
FIG. 1 is a schematic view of a prior-art brightfield microscope slide scanner using a linear or linear TDI detector array.
Figure 2:
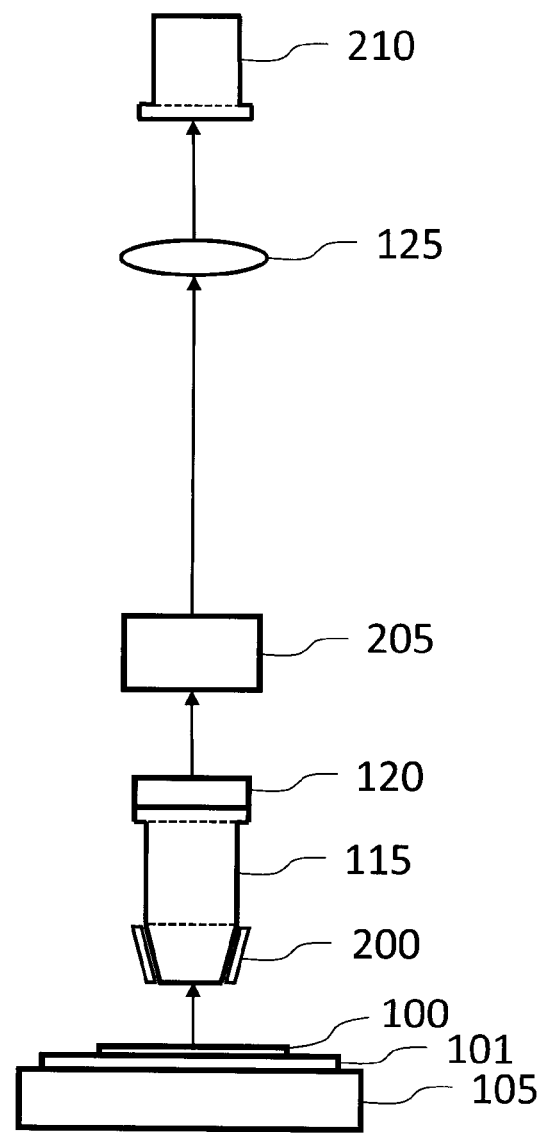
FIG. 2 is a schematic view of a prior-art fluorescence microscope slide scanner using a linear or linear TDI detector array.
Figure 3:
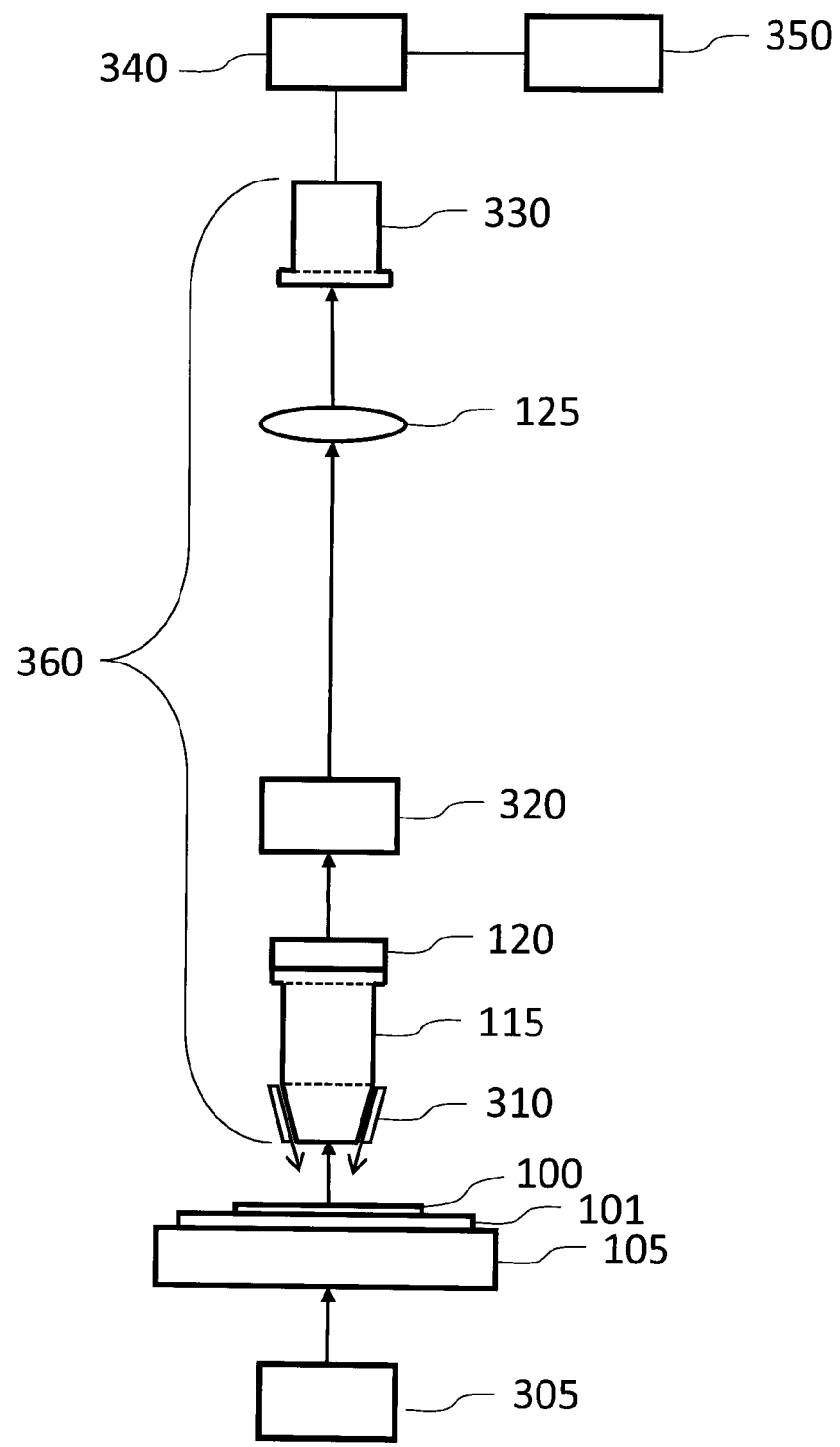
FIG. 3 is a schematic view of a microscope slide scanner for fluorescence and brightfield imaging using an area detector array.

FIG. 3 shows a microscope for fluorescence and brightfield imaging that is a first embodiment of this invention. A tissue specimen 100 (or other specimen to be imaged) mounted on microscope slide 101 on a scanning stage 105. When used for fluorescence imaging, the tissue specimen is illuminated from above by illumination source 310, mounted above the specimen (epifluorescence) so that the intense illumination light that passes through the specimen is not mixed with the weaker fluorescence emission from the specimen, as it would be if the fluorescence illumination source were below the specimen. Several different optical combinations can be used for epifluorescence illumination—light from a source mounted on the microscope objective, as shown; illumination light that is injected into the microscope tube between the microscope objective and the tube lens, imaged onto the back aperture of the objective, using a dichroic beamsplitter to reflect it down through the microscope objective and onto the specimen; and several others. A narrow wavelength band for the illumination light is chosen to match the absorption peak of the fluorophore in use. This narrow-band illumination may come from a filtered white-light source, an LED or laser-based source (including a laser sent through a diffuser plate in rapid motion to eliminate speckle), or other source. Fluorescence emitted by the specimen is collected by infinity-corrected microscope objective 115 (or other high-numerical-aperture objective lens) which is focused on the specimen by piezo positioner 120 (or other focusing mechanism). Emission filter 320 is chosen to reject light at the illumination wavelength and to pass the emission band of the fluorophore in use. The microscope objective 115 and tube lens 125 form a real image of the specimen on two-dimensional detector array 330. An image of the specimen is collected by moving the microscope slide at constant speed using motorized stage 105 in a direction perpendicular to the long dimension of detector array 330, combining a sequence of equally-spaced overlapping two-dimensional images from the array (usually spaced one line apart) to construct a time-integrated image of one strip of the specimen. Data from detector array 330 is read out by frame grabber 340 and passed to computer 350 where strips are then assembled to form a complete image of the specimen. The detector array of the present invention is referred to as being a two dimensional array because a signal from the entire detector array (from each line) is sent to the processor whenever a signal is sent. Preferably, the scanning stage 105 moves and a microscope optical train 360, which includes the detector array 330 does not move laterally. Alternatively, the stage 105 can be mounted in a fixed position and the optical train 360 can be moved laterally in a direction opposite to the direction that the slide 101 is shown to move in FIG. 4.

When used for brightfield imaging, transmitted-light illumination source 305 is used instead of illumination source 310 (which illuminates the specimen from above) and emission filter 320 is removed from the optical train 360.

Figure 4:
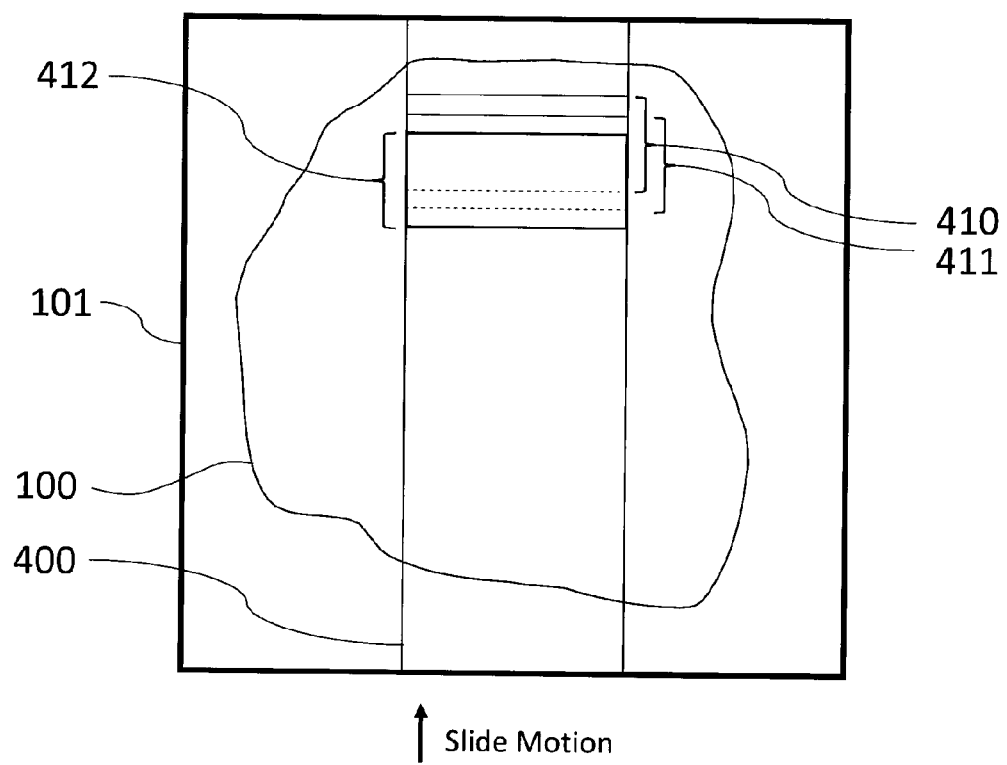
FIG. 4 shows the relative motion of the field-of-view of an area detector array with the motion of a large specimen on a microscope slide which is moving at constant speed on a motor-driven stage.

FIG. 4 shows a specimen 100 mounted on a microscope slide 101. Note that in this diagram the microscope slide is square, but it can have any convenient size and shape, including standard 1×3 inch microscope slides up to very large slides (we have imaged specimens on slides 6×8 inches in size) and for the purposes of this document, the term "microscope slide" includes slides made from glass or other medium (usually but not always transparent) and any other specimen carrier including but not limited to microwell plates and tissue blocks. Specimens may be covered with a cover slip.

In FIG. 4, the specimen is larger than the field-of-view 412 of the two dimensional microscope detector array. In this example, three image strips are required to image the entire specimen 100, but for a larger specimen many more strips may be required. In order to scan specimen strip 400, microscope stage 105 of FIG. 3 moves the microscope slide 101 at constant speed in the direction shown in FIG. 4 (or the microscope optical train 360 shown in FIG. 3 is moved at constant speed in the opposite direction). Alternatively, the detector array can be moved and the specimen can remain in a fixed location. An electronic or mechanical shutter opens for a short time to expose the sensors that make up the two-dimensional detector array 330 (not shown in FIG. 4).

Figure 5:
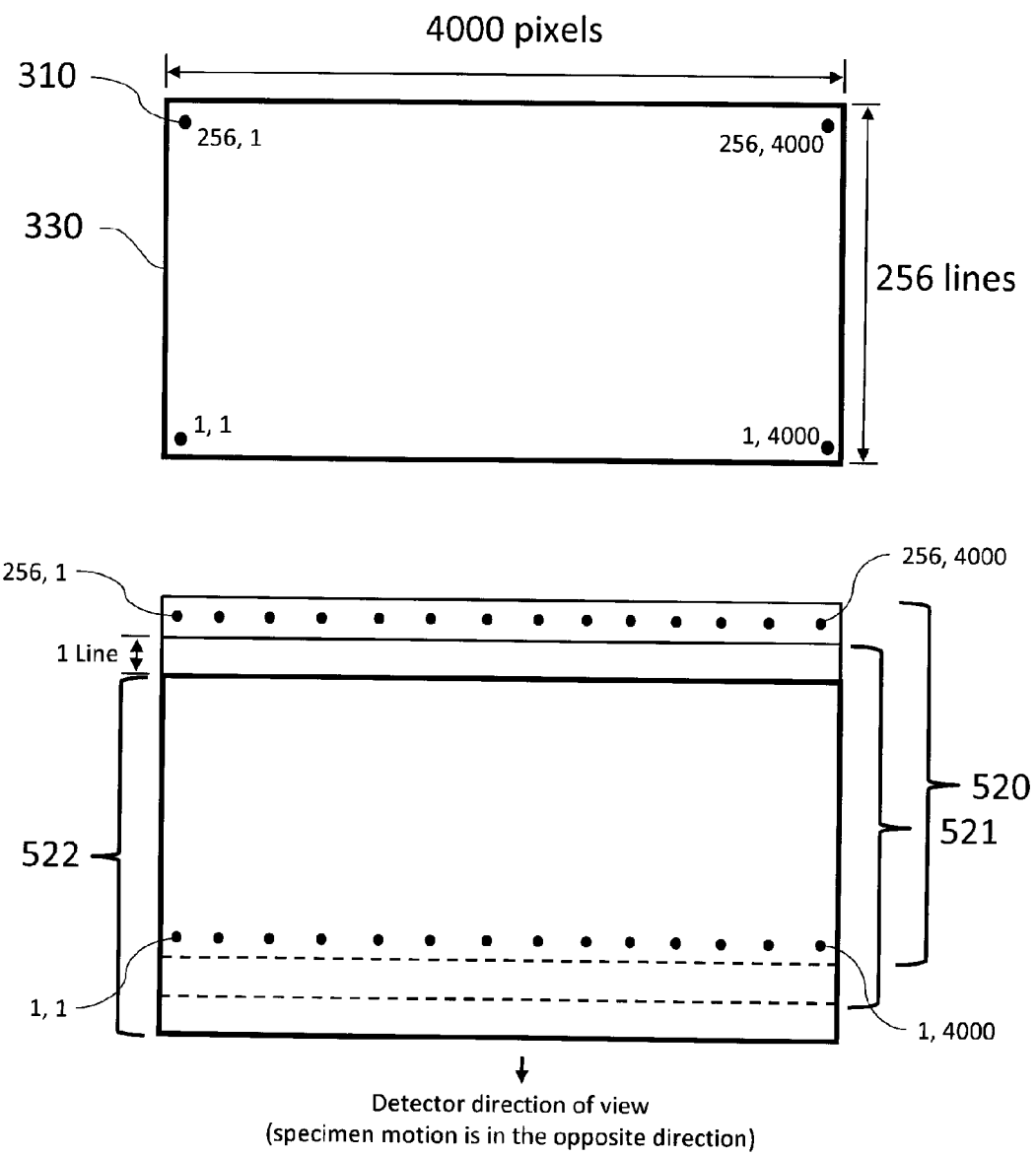
FIG. 5 shows a schematic view of a 256×4000 pixel detector array (top) and a schematic view of the motion of the field-of-view of the array as the stage moves the specimen during scan (bottom).

The detector array 330 is shown in detail in FIG. 5. The exposure time is short enough so that, during exposure, the constant relative motion of the detector array and microscope slide moves field-of-view 410 only part of the way to the adjacent field-of-view 411, which is one pixel away from 410 as shown in FIG. 4. During the time the shutter is closed, data in the entire two-dimensional detector array is transferred to frame-buffer RAM in a frame grabber 340 or to other electronic frame capture device, and is then transferred to a computer 350 as shown in FIG. 3. When the field-of-view moves to position 411 of FIG. 4, the shutter is opened again and a new image frame is collected, the shutter is then closed and this new image is then transferred via the frame grabber to the computer, where this data is added to the image data already stored, but shifted one pixel in the direction of motion of the field-of-view. This process is repeated until a complete image of that particular specimen strip is stored, starting with a first image frame (first exposure) just above the top edge of the specimen of FIG. 4 to a final image frame just below the bottom edge of the specimen (in order to ensure that every part of the specimen is exposed 256 times, once for each line of pixels in the detector array). For example, the two dimensional detector array 330 is comprised of 4000 pixels by 256 lines, as shown in FIG. 5 {which shows a CCD or CMOS (or other technology) two-dimensional sensor array 330 with 256 lines of 4000 pixels each (a 256×4000 pixel array)}. Although this particular two dimensional array has been chosen as an example, two dimensional arrays with different numbers of pixels and different aspect ratios can also be used. In particular, this means that inexpensive two dimensional arrays manufactured for consumer products can be used, if necessary, to reduce cost. Using the two dimensional array shown in FIG. 5, each pixel in the final strip image stored in the computer 350 is the sum of 256 exposures of the same pixel position in the specimen. In this particular example, if the frame grabber produces 8-bit images, the resulting stored image has a dynamic range of 16 bits (each pixel is made up of a sum of 256 exposures where each exposure has a maximum value of 255). The fluorescence image of the strip is stored and adjacent strip images are assembled to produce a final image of the specimen. Adjacent strips may be assembled by butting them together, or by collecting overlapping strip images and using feature-matching software for registration.

As an example, using the 256×4000 pixel 8-bit pixel two dimensional array described above, if a specimen 1 cm long is scanned at 0.25 micron resolution (approx. 40×), a total of 40,255 frames must be acquired in order to expose every pixel 256 times (1 cm×40,000 lines/cm+255). The strip image will contain 40,000×4,000 pixels. If the 16-bit memory locations for each pixel are set to zero before the scan starts, then the value for each pixel at the end of the scan is given by:

$$P_{m,n} = \sum_{i=m}^{i=m+255} p_{\{i-(m-1)\},n,i}$$

where $P_{m,n}$ is the final value for each pixel in the strip image, m is the line number in the strip image (in this example of a 1 cm strip on the specimen, m varies from 1 to 40,000), and n is the column number in the strip image (in this example, n varies from 1 to 4,000). On the right-hand side of the equation, $p_{\{i-(m-1)\},n,i}$ represents the pixel value for pixels in each detector image frame, where $\{i-(m-1)\}$ represents the row number of the pixel and n represents the column number of the pixel in frame number i. Each pixel P in the final image is the sum of 256 detector image pixels from 256 sequential frames, where the column number varies from 1 to 4,000 (the same number as in the detector image frames) and the row number varies from 1 to 40,000. The running index in the sum is 1, and i also equals the frame number (in this example, i varies from 1 to 40,255).

If the resulting image from the example above is to be viewed in a display with the same dynamic range as the image from each detector frame (8 bits in the example above), the value stored in each pixel position above can be multiplied by 1/N, where N is the number of frames exposed and this value is stored in each pixel position in the final image (N=256 in the example above). To ensure the best possible dynamic range in the final image, data contraction as described in WO2009/137935 A1 can be used when converting from an image stored in 16-bit memory locations in order to use the entire dynamic range in the final 8-bit image.

If the scanning stage is set to move at a constant speed of 100 microns/second (1/10 mm/second), and assuming the same 0.25 micron object pixel resolution and 4000×256 pixel two dimensional detector array as used in the example above, lines of data are collected at 400 lines/second (this is similar to a scan rate of 400 lines/second in a scanning laser microscope or macroscope). If an exposure time of 1/1000 second is used, the moving specimen stage will move less than half the distance between adjacent pixels during the time the shutter is open, and since 256 lines of data from the two dimensional detector array are summed into each line of data in the final image, the total exposure time for each pixel in the final image is 256/1000 seconds, or approximately 250 milliseconds. By comparison, if a linear detector array is used at the same scan speed, the exposure time is only 1 millisecond, which is too short for weak fluorophores. Note that the operation of the shutter should be closely synchronized with stage motion, just as it must be if TDI detectors were used instead of the two-dimensional detector arrays described in this application. (Note: the specimen image may have enough features to allow sequential image frames to be registered using feature-matching software, which reduces the requirement for synchronization between sequential image frames and therefore would allow a less-expensive moving stage to be used.)

In the example above, the exposure time for each image is 1 msec., leaving approximately 1 msec. to read out the data in the two dimensional array before the scanning stage has moved a distance equal to the distance between pixels on the specimen. If this read-out time is too short to read out the two dimensional array, the next exposure can be synchronized to start when the stage has moved a distance equal to an integral number of pixels instead of the distance between adjacent pixels, thus increasing the read-out time while keeping the scan speed unchanged. The number of images added together to form the final image will be reduced by a factor equal to 1/s, where s is the number of pixels the stage moves between exposures. (s=1 when the next exposure is at the next pixel position, s=2 if the next exposure is two pixels distance away, etc.) This technique can also be used to increase the scan speed, while keeping the exposure time constant. If s=16, for example, then only 16 images are added together (or averaged), but the scan speed can be increased dramatically. If the exposure time is kept constant, then the measured pixels will be elongated in the direction of scan, but this may be acceptable if the image collected is a high-speed preview scan, and the dynamic range of data in this preview image can be used to calculate proper exposure for a final, slower scan before that scan starts.

Figure 6:
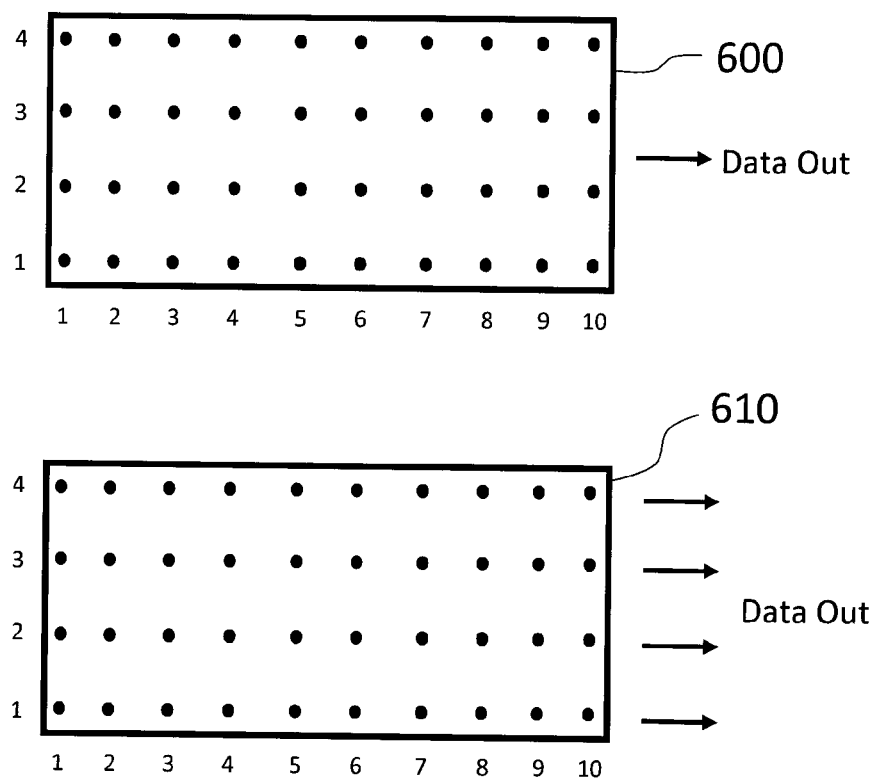
FIG. 6 shows schematic views of two different output arrangements for a detector array:
Top—the entire image is read out one pixel at-a-time which is common in area arrays.
Bottom—all lines in the array are transferred out in parallel directly to lines in the image store.

FIG. 6 (top) shows a rectangular two dimensional detector array 600 of 40 pixels (10 pixels by 4 lines). In an ordinary two dimensional array, the entire frame is read out through the same output port, which can be time consuming (especially for a large array like the 1,024,000 pixel array described in the example above (4000 pixels by 256 lines). FIG. 6 (bottom) shows a second rectangular detector array 610 that also has 40 pixels (10 pixels by 4 lines), but in this array each line is read out through its own output port. Read-out time can be reduced substantially if the lines of data are read out simultaneously into a frame buffer, where they can be stored for further processing. In theory, this could reduce the read-out time of the 1,024,000 pixel array used as example previously by a factor of 1/256. Additionally, since in this application lines of data from the detector array are added in a moving sequence to lines of data stored in a strip image, lines can be shifted and added to the appropriate memory locations in the strip image as parallel processes, thus reducing the computational load as well.

Using this same example of a 4000 pixel by 256 line array, consider a scanner where the required magnification is similar to that from an optical microscope with a 40× objective. The digital image produced by this scanner will have pixels approximately 0.25 microns in size, and 4000 pixels represent the width of a 1 mm wide strip on the specimen. The microscope objective needs a resolving power of 0.5 microns or smaller (numerical aperture of 0.6 or larger), and the Nyquist theorem requires at least two pixels per resolving power for digital imaging (see "Choosing Objective Lenses: The Importance of Numerical Aperture and Magnification in Digital Optical Microscopy", David W. Piston, Biol. Bull. 195, 1-4 (1998) for an explanation of the requirements for diffraction-limited digital microscopy, which is incorporated by reference). To image 0.25 micron pixels on the specimen onto a detector array with sensors spaced 10 microns apart, the system magnification (objective lens plus tube lens) must be 40×. A microscope objective with a numerical aperture of 0.75 and a focal length of 10 mm is available (this is labeled a 20× objective, but that label assumes a particular tube lens with focal length 200 mm). Since Magnification=$f_{tube\ lens}/f_{microscope\ objective}$, $f_{tub\ lens}$=40×10=400 mm.

The tube lens must be able to form an image at least 4 cm wide for the detector array described above. The combination of an infinity-corrected microscope objective (or other infinity-corrected objective lens) and a tube lens is used because it is possible to insert filters, filter cubes, and beamsplitters into the optical path between the objective and the tube lens without affecting instrument focus and optical performance.

Figure 7:
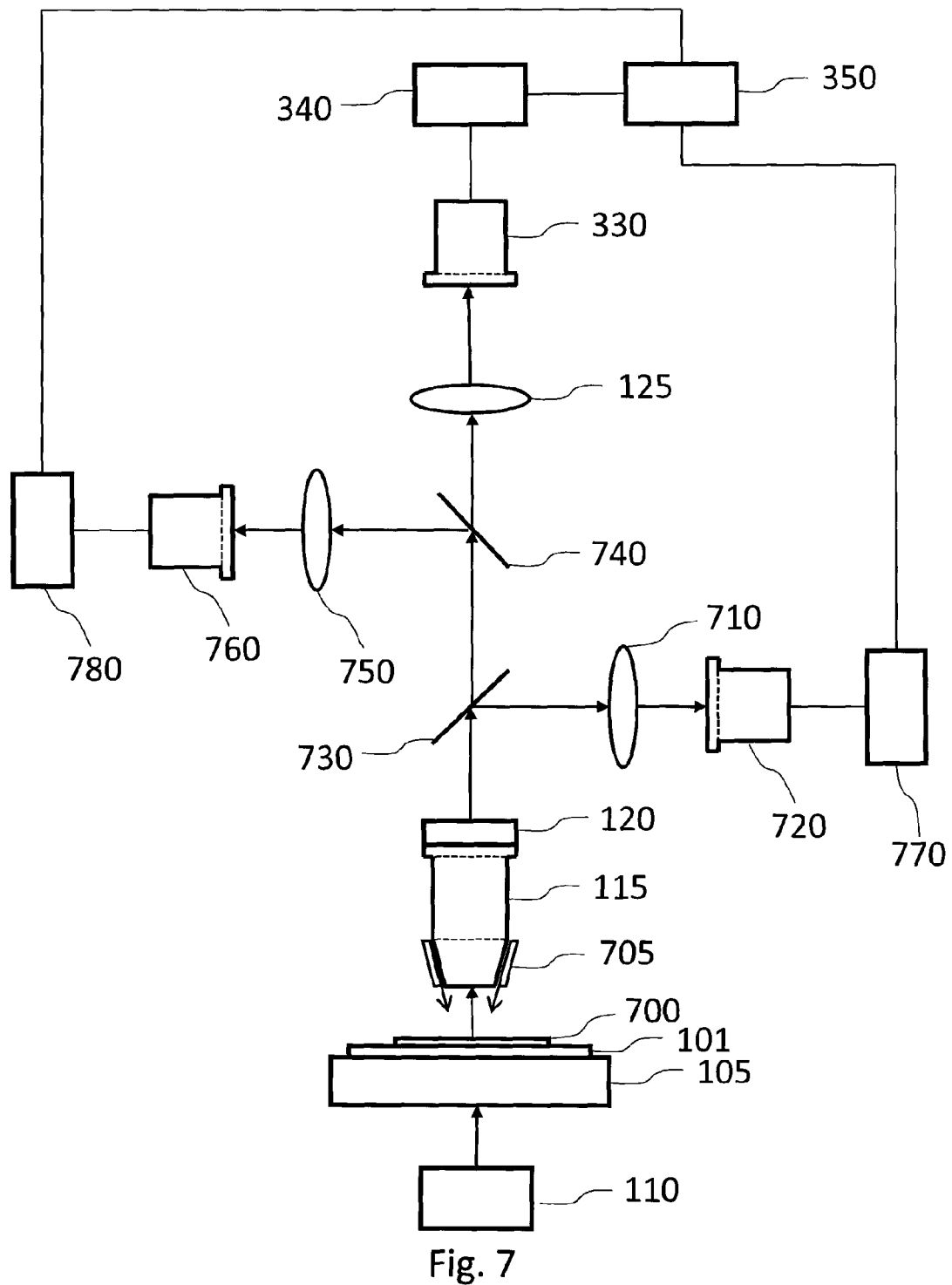
FIG. 7 shows a microscope slide scanner using area detector arrays and multiple detection arms for simultaneous detection of three fluorophores.

FIG. 7 shows a microscope for fluorescence or brightfield imaging that is a second embodiment of this invention. When used for fluorescence imaging, a tissue specimen 700 (or other specimen to be imaged) which has been stained with three different fluorescent dyes is mounted on microscope slide 101 on a scanning stage 105. The tissue specimen is illuminated from above by illumination source 705, mounted above the specimen (epifluorescence) so that the intense illumination light that passes through the specimen is not mixed with the weaker fluorescence emission from the specimen, as it would be if the illumination source were below the specimen. Several different optical combinations can be used for epifluorescence illumination—light from a source mounted on the microscope objective, as shown; converging illumination light that is injected into the microscope tube between the microscope objective and the tube lens that focuses on the back aperture of the objective, using a dichroic beamsplitter to reflect it down through the microscope objective and onto the specimen; and several others. Narrow wavelength bands are chosen for the illumination light to match the absorption peaks of the fluorophores in use. This narrow-band illumination may come from a filtered white-light source, an LED or laser-based source (including an amplitude or frequency-modulated laser or LED source), or other source. Fluorescence emitted by the specimen is collected by infinity-corrected microscope objective 115 (or other high-numerical-aperture objective lens) which is focused on the specimen by piezo positioner 120 (or other focusing mechanism). Dichroic mirror 730 is chosen to reflect light in the emission band of the first fluorophore towards tube lens 710 placed in front of two-dimensional detector array 720. Microscope objective 115 and tube lens 710 form a real image of the specimen on two-dimensional detector array 720. Data from the two-dimensional detector array is collected by frame grabber 770 or other electronic frame capture device and passed to computer 350.

Light from the specimen 700 that was not reflected by dichroic mirror 730 continues up the microscope to reach dichroic mirror 740, which is chosen to reflect light in the emission band of the second fluorophore towards tube lens 750 placed in front of two-dimensional detector array 760. The microscope objective 115 and tube lens 750 form a real image of the specimen on two-dimensional detector array 760. Data from this two-dimensional detector array is read out by frame grabber 780 or other electronic frame capture device and passed to computer 350.

Light from the specimen 700 that was not reflected by dichroic mirrors 730 and 740 contains light in the emission band wavelengths for the third fluorophore, and continues up the microscope to reach tube lens 125, in front of two-dimensional detector array 330. The microscope objective 115 and tube lens 125 form a real image of the specimen on two-dimensional detector array 330. Data from this two-dimensional detector array is read out by frame grabber 340 or other electronic frame capture device and passed to computer 350.

An image of the specimen is collected by moving the microscope slide at constant speed using motorized stage 105 in a direction perpendicular to the long dimension of the three detector arrays 720, 760 and 330 (which are all oriented with the long dimension of the arrays perpendicular to the motion of the real images projected on them by the microscope objective 115 and tube lenses 710, 750 and 125 respectively). A sequence of equally-spaced overlapping two-dimensional images from the each of the three arrays is passed to computer 350 by frame grabbers 770, 780 and 340 where three time-integrated images of one strip of the specimen are constructed, one for each fluorophore. These three images can be viewed separately (fluorescence images are essentially grey-scale images) or combined using false colours into a colour image for viewing. In many cases the false colours are chosen to make the final image look like the image that would be seen through a fluorescence microscope.

FIG. 7 shows a scanner with three detection arms, one for each of three fluorophores (a scanner can also be envisioned for other numbers of fluorophores). In particular, if quantum dots (nanocrystals) are used as a contrast agent in fluorescence, several detection arms can be used. This is possible because quantum dots can be manufactured with very narrow emission bands, and they are inherently brighter and more stable than fluorophores. In addition, all quantum dots in a specimen can be excited with the same excitation wavelength, so a single wavelength source can be used which is not in the emission bands of any of the dots in the specimen, making it easier to separate the emission signals.

When used for brightfield imaging, white light source 110 is used to illuminate the specimen from below (instead of using light source 310), and the dichroic mirrors 730 and 740 are chosen to separate the colours detected by area detectors 760, 720 and 330 into red, green and blue. Images from each of the three detection arms are combined to produce a colour brightfield image. If area detector 330 is replaced by an RGB detector, dichroic mirrors 730 and 740 can be removed from the optical train and the single colour detector array will produce a colour brightfield image.

Instead of using three detection arms, as shown in FIG. 7, it is also possible to use a trichroic prism to separate light emitted from three fluorophores to be focused on three ccd detectors. Such an assembly can also be used for RGB brightfield imaging.

Figure 8:
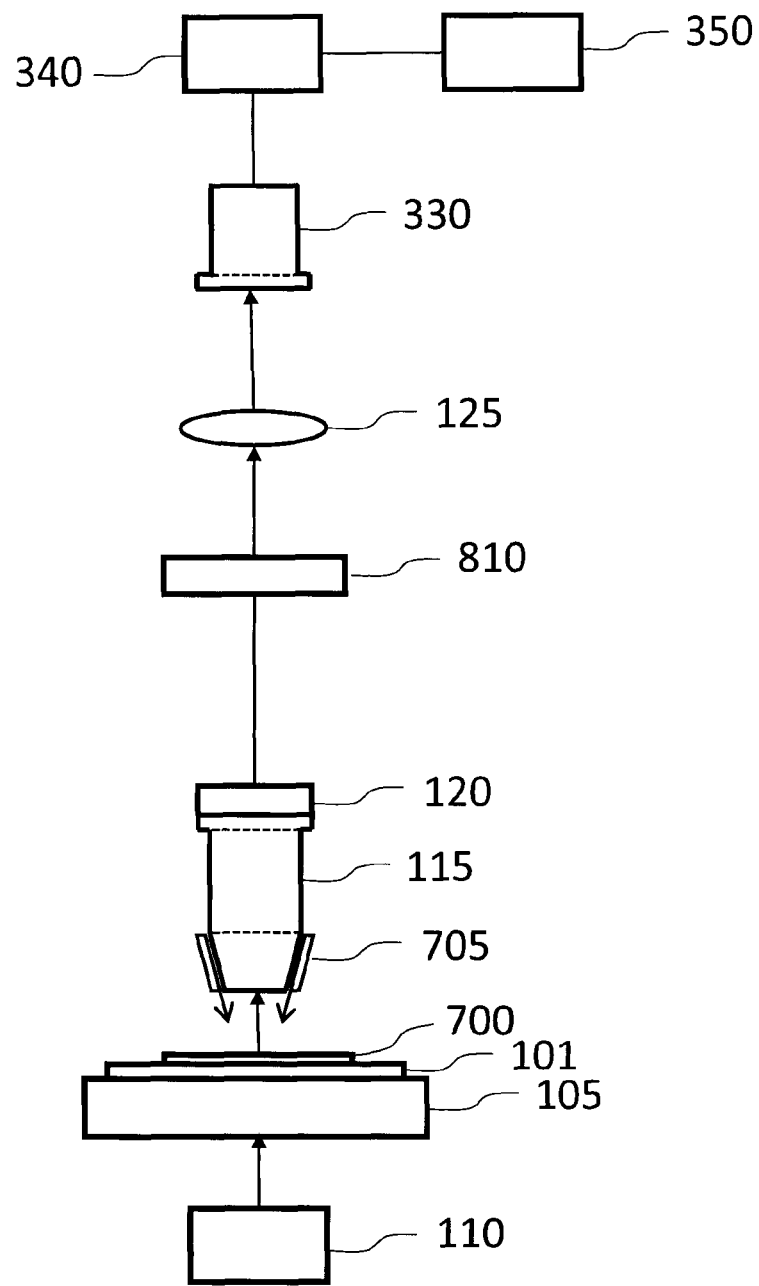
FIG. 8 shows a microscope slide scanner using a tunable filter to select the wavelength band for recording either brightfield or fluorescence images, where each colour image is recorded in sequence.

FIG. 8 shows a third embodiment of this invention, being a scanner in which a tunable filter 810 is used to provide a multi-spectral fluorescence slide scanner and method for imaging large specimens mounted on microscope slides. The tunable filter can be set to transmit a band of emission wavelengths from one fluorophore (or other fluorescent source) and a strip image recorded for that source, followed by setting a second wavelength band for a second fluorophore to record a strip image for that source, and so on until a strip image has been recorded for each fluorescence source in the specimen. The strip images can either be viewed separately or combined into a single image (usually false coloured) and the strips can then be assembled into a single image of the entire specimen. This instrument can also be used for brightfield imaging by replacing epifluorescence source 705 with white light transmission source 110, and using the tunable filter 810 to pass red, green and blue wavelengths to record red, green and blue strip images in sequence which can be combined into a single RGB brightfield image.

Figure 9:
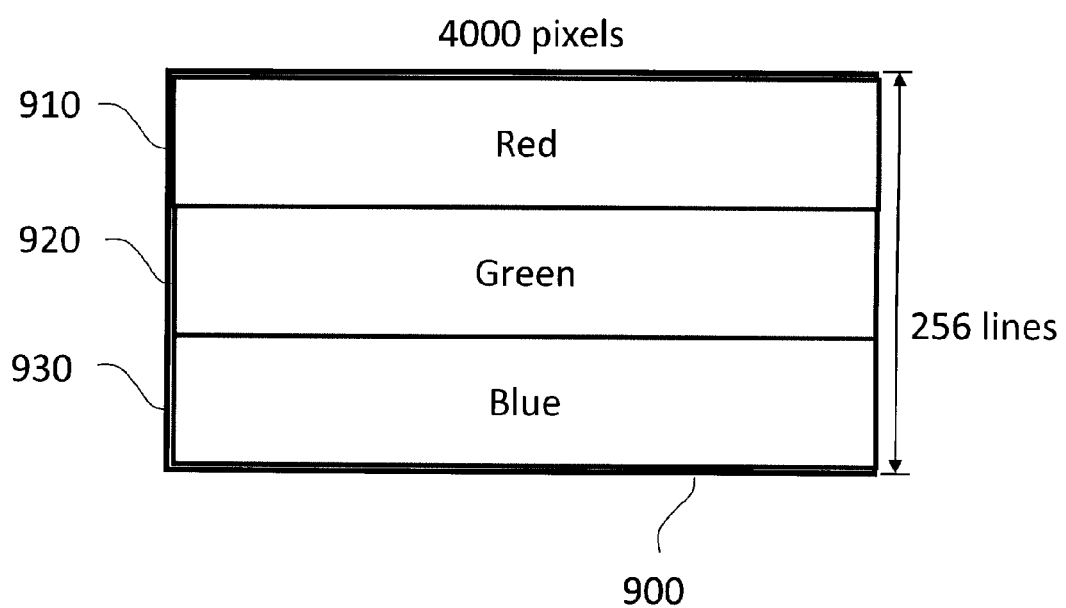
FIG. 9 shows a detector array for simultaneous imaging of three colours by covering fractions of the detector with filters that pass red, green or blue light to the three areas of the detector array.

FIG. 9 shows a single two-dimensional CCD (or other technology) array 900 in which the top third 910 of the array is covered with a red transmission filter, the middle third 920 is covered with a green transmission filter, and the bottom third 930 is covered with a blue transmission filter. Such an array can be used to simultaneously image three colours, for example red, green and blue for brightfield imaging, or three different fluorophores in multi-spectral fluorescence (where the transmission filters are chosen with bandwidths that match the fluorescence emission peaks).

Figure 10:
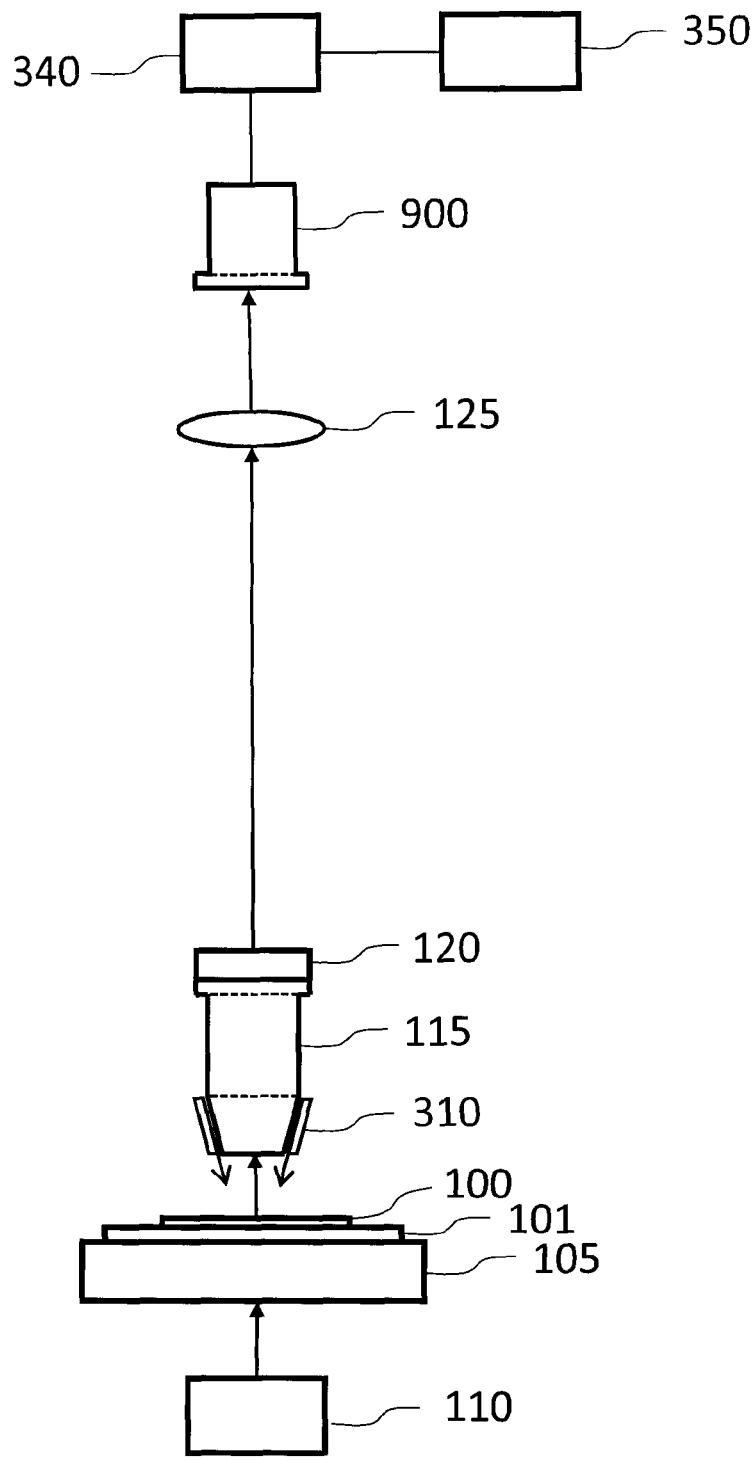
FIG. 10 shows a microscope slide scanner that uses a detector array with multiple strips of coloured transmission filters to record simultaneous images of brightfield or multiple fluorescence sources.

FIG. 10 shows a fourth embodiment of this invention, being a scanner in which a detector array 900 (covered with red, green and blue transmission filters as discussed above) simultaneously records three strip images (red, green and blue) when white light transmission source 110 is used to illuminate the specimen from below. Image data from the top third 910 of array 900 is used to record the red image, data from the middle third 920 of the array 900 is used to record the green image, and that from the bottom third 930 of the array 900 is used to record the blue image. Each of these images is recorded in separate strip images that can be combined into an RGB image after the scan for that strip is completed. Note that FIG. 9 shows a 4000 pixel×256 line array—this is for example only—arrays with different pixel number width and number of lines can also be used.

For fluorescence imaging, the epifluorescence light source 310 (or other epifluorescence source) is used instead of white light source 110, and transmission filters are chosen to cover fractions of the array 900, one matching the peak of the emission band of each fluorophore in the specimen. In particular, if fluorescent nanoparticles are used as the fluorescence source, a filter is chosen with transmission bandwidth to match the emission peak of each of the nanoparticles, and fluorescence from several nanoparticles can be imaged simultaneously.

While the detector array preferably moves at a constant speed relative to the specimen, movement of the detector array relative to the specimen at a constant speed is not required. Movement at a constant speed is faster than intermittent movement. Also, when the detector array moves relative to the specimen at a constant speed, the taking of images is faster and there is no vibration of the instrument. Alternatively, the controller can be programmed to move the detector array relative to the specimen by successive distance X and such movement can stop as desired. The controller can control movement of the specimen relative to the detector array so that each time that the detector array moves relative to the specimen by a distance X, the movement can stop and the controller can open the shutter to take an image. When the image is taken, the detector array can move relative to the specimen by a further distance X and the shutter can again open after the movement stops. While movement at a constant speed is preferred, in some uses, for example, for a high speed preview scan, it is preferred to stop movement of the detector during the time that the shutter is open, thereby eliminating any motion blur.

I claim:

1. An instrument for scanning at least a portion of a large specimen, said instrument comprising an imaging system having an optical train to focus light from the specimen onto a two dimensional detector array, said detector array being part of the optical train, said specimen being supported on a specimen holder, said holder being movable relative to said detector array in a direction perpendicular to an edge dimension of said detector array and perpendicular to an optical train of the instrument, said specimen moving with said holder, said detector array being configured to receive data from said specimen through said imaging system when a shutter of said detector array is open and to pass data to a processor when said shutter is closed, said shutter being controllable by a controller to open and close as said holder moves relative to said detector array and said optical train, said detector array having N lines a distance X apart, said stage and said specimen being movable relative to said detector array by successive distances of MX on said detector array and corresponding successive distances of MY on said specimen, said shutter being controllable by a controller to open briefly and to close within each incremental distance MX said detector array moves relative to said specimen, said shutter being controllable to repeatedly open and close numerous times for each image strip taken of said specimen, there being a sufficient number of image strips taken to enable said specimen to be at least partially scanned so that each part of said specimen being scanned is exposed to said detector array N/M times resulting in N/M overlapping area images being taken for each part of said specimen being scanned, said processor being programmed to add together data for all N/M exposures for each line in the image strip for each part of said specimen being scanned and to assemble the resulting image strips for all parts of the specimen being scanned in order to produce a contiguous image of said portion of said specimen being scanned, where N is the number of lines in said detector array and is greater than 1, X is the distance between the lines of the detector array, Y is a distance on the specimen corresponding to the distance X on the detector array and M is a positive integer.

2. The instrument as claimed in claim 1 wherein the instrument is capable of scanning a large specimen in its entirety.

3. The instrument as claimed in claim 1 wherein M is equal to one of 1, 2, 3, 4, 5 or 6.

4. The instrument as claimed in claim 3 wherein the instrument is a fluorescence imaging system for macroscopic specimens in which a correct gain setting for fluorescence imaging can be estimated from a preview scan of the entire specimen or part thereof before a final scan is commenced.

5. The instrument as claimed in claim 3 wherein there is a fluorescence imaging system for macroscopic specimens in which a correct gain setting for each fluorophore detection channel when simultaneously imaging multiple fluorophores can be estimated from a preview scan of the entire specimen of or part thereof before the final scan is commenced.

6. The instrument as claimed in claim 3 wherein an imaging system is provided for imaging specimens containing fluorescence nanoparticles in which a correct gain setting for fluorescence imaging can be estimated from a preview scan of the entire specimen or part thereof before the final scan is commenced.

7. The instrument as claimed in claim 1, wherein Y/X is a magnification factor of said imaging system.

8. The instrument as claimed in claim 7 wherein the imaging system is selected from a group of a microscope, a digital camera other than a CCD camera and a CCD camera.

9. The instrument as claimed in claim 1 wherein there is more than one two-dimensional detector array.

10. The instrument as claimed in claim 9 wherein said instrument allows simultaneous imaging of multiple fluorophores, even where there is a large difference in signal strength of the different fluorophores.

11. The instrument as claimed in claim 10 wherein said large specimen is a microscope specimen and said instrument is capable of detecting multiple fluorophores in said large microscope specimen.

12. The instrument is claimed in claim 1 wherein said two-dimensional detector array is one of a CCD or CMOS array.

13. The instrument as claimed in claim 12 wherein said instrument is capable of adding together a sequence of overlapping images on a line-by-line basis to reduce noise in an image of said specimen.

14. The instrument as claimed in claim 1 wherein there is a frame grabber configured to read said data from said detector array and to pass said data to said processor.

15. The instrument as claimed in claim 1 wherein a dynamic range of the instrument is larger than a dynamic range of the detector array.

16. The instrument as claimed in claim 1 wherein said instrument is capable of acquiring fluorescence images in which image data from each fluorophore substantially fills a dynamic range available in a final image file by acquiring and storing image data in files with larger dynamic range, then contracting the image data to fill the dynamic range in the final image file.

17. The instrument as claimed in claim 1 wherein a means is provided for acquiring an image of an entire specimen which can be used as an index image, followed by acquisition of single field-of-view images at one or several positions on the specimen, said instrument being capable of acquiring said single field-of-view images while said stage is stationary, said images being one of brightfield or fluorescence images.

18. The instrument as claimed in claim 1 wherein the specimen holder is a movable stage, the stage being movable at relative to the two dimensional detector array in a direction perpendicular to the edge dimension of the detector array, the detector array remaining in a fixed position.

19. The instrument as claimed in claim 18 wherein the stage is movable at a constant velocity relative to the two-dimensional detector array.

20. The instrument as claimed in claim 1 wherein the holder is movable relative to the two dimensional detector array in a direction perpendicular to the edge dimension of the detector array by moving an optical train, including the detector array, laterally in a direction that is perpendicular to the edge dimension of the detector array, the holder remaining in a fixed position.

21. The instrument as claimed in claim 20 wherein the holder is movable at a constant velocity relative to the two-dimensional detector array by moving the optical train including the detector array laterally at a constant speed.

22. The instrument as claimed in claim 1 wherein scanning is used to obtain an image of at least a part of the specimen which is then used as an index image, the instrument taking one or more single field-of-view images at one or more positions of interest respectively in the index image where such single field-of-view images are acquired while there is no relative movement between the holder and the detector array.

23. The instrument as claimed in claim 22 wherein the one or more single field-of-view images are one of brightfield and fluorescence images.

24. The instrument as claimed in claim 22 wherein several single field-of-view images are taken to allow an operator to view changes in the specimen as a function of time.

25. The instrument as claimed in claim 22 wherein exposure of the single field of view fluorescence images is increased by increasing the time that the shutter is open.

26. The instrument as claimed in claim 22 wherein exposure is increased by adding a series of images of the same field of view which allows a dynamic range of an image to be larger than that of the detector array.

27. The instrument as claimed in claim 22 wherein increased optical resolution can be achieved in the single field of view images using structured illumination.

28. The instrument as claimed in claim 22 wherein optical sectioning can be accomplished in the single field of view images by injecting a laser beam into a tube of the microscope through a diffuser plate, which is imaged onto a back aperture of the objective.

29. The instrument as claimed in claim 22 wherein optical sectioning can be accomplished in a single field of view images by illuminating the specimen directly.

30. The instrument as claimed in claim 22 wherein two images can be acquired, one illuminated by speckle when a diffuser plate is stationary and a second uniform-illumination image when the diffuser plate is in rapid motion.

31. The instrument as claimed in claim 30 wherein the two images can be processed and combined to give a final optically-sectioned high resolution image.

32. The instrument as claimed in claim 30 wherein optical sectioning can be accomplished in the stationary images by injecting a laser beam into a tube of the microscope through a diffuser plate, which is imaged onto a back aperture of the objective.

33. A method of scanning at least a portion of a large specimen using an instrument comprising an imaging device having at least one lens, a holder to support said specimen, a two dimensional area detector array and a processor, said holder and said specimen being movable relative to said detector array, said method comprising moving said holder and said specimen relative to said detector array in a direction perpendicular to an edge dimension of said detector array and perpendicular to an optical train of the instrument, configuring said detector array to receive data from said specimen through said imaging device when a shutter of said detector array is open and to pass data to said processor when said shutter is closed, said detector array having N lines a distance X apart, moving said holder and said specimen relative to said detector array by successive distances of MX on said detector array and distances of MY on said specimen for each line of said detector array, operating a controller to briefly open and close said shutter within each incremental distance MX that said detector array moves relative to said specimen and corresponding incremental distance MY on said specimen, controlling said shutter to repeatedly open and close numerous times for each image strip of said specimen, taking a sufficient number of image strips to enable said specimen to be at least partially scanned so that each part of said specimen that is being scanned is exposed to said detector array N/M times resulting in N/M overlapping area images being taken for each part of said specimen, programming said processor to add together data for all N/M exposures of each line in the image strip for each part of said specimen being scanned and to assemble the resulting image strips for all of the parts of at least said portion of the specimen being scanned in order to produce a contiguous image of at least said portion of said specimen being scanned, where N is the number of lines in said detector array and is greater than 1, X is the distance between the lines of the detector array, Y is a distance on the specimen corresponding to the distance X on the detector array and M is a positive integer.

34. The method as claimed in claim 33 including the step of taking a sufficient number of image strips to enable the specimen to be entirely scanned.

35. The method as claimed in claim 34 including the step of using a frame grabber to capture the image.

36. The method as claimed in claim 33 including the steps of choosing M to be equal to one of 1, 2, 3, 4, 5 or 6.

37. The method as claimed in claim 33 including the steps of increasing the velocity of the moving stage by a factor of M, whereby a high-speed preview scan is accomplished.

38. The method as claimed in claim 37 including the steps of using the instrument for fluorescence imaging of genetic, protein or tissue microarrays.

39. The method as claimed in claim 37 including the steps of using the instrument for fluorescence imaging, estimating one of the correct gain setting or dark current offset from a high speed preview scan of or part of said specimen.

40. The method as claimed in claim 39 including the steps of using a Charge-Coupled Device (CCD) GGD or Complementary Metal-Oxide-Semiconductor (CMOS) CMOS two dimensional array, acquiring an image of the entire large specimen which can be used as an index image, subsequently acquiring single field of view images at one or several positions on the large specimen while said specimen is stationary, allowing an operator to view changes in the specimen as a function of time or to increase an exposure of an image.

41. The method as claimed in claim 37 including the steps of using a Charged Coupled Device (CCD) or Complementary Metal Oxide Semiconductor (CMOS) two dimensional array, operating the instrument to conduct brightfield imaging of the large specimen, dividing the two dimensional array into thirds, covering one third with a red transmission filter, covering another third with a green transmission filter and covering a remaining third with a blue transmission filter, operating the instrument so that each one third of the detector array acquires an image strip and combining the three images digitally to produce a RGB brightfield image of said large specimen.

42. The method as claimed in claim 37 including the steps of using a CCD or CMOS two dimensional detector array, conducting fluorescence imaging of said large specimen, the specimen containing multiple fluorescent dyes or other sources of fluorescence, dividing the detector array into fractions, one fraction for each fluorescence source, covering each fraction with a transmission filter that transmits the emission peak of one of the fluorescent dyes or sources, in which each fraction of the detector acquires a image strip image and combining the multiple strip images digitally to produce a single fluorescence image.

43. The method as claimed in claim 37 including the steps of using a CCD or CMOS two dimensional detector array and a tunable filter to provide a multi-spectral fluorescence slide scanner and method for imaging large specimens mounted on microscope slides on said stage.

44. The method as claimed in claim 37 including the step of creating a sparse image of said at least a portion of the large image being scanned.

45. The method as claimed in claim 37 including the step of scanning the specimen at a proper exposure.

46. The method as claimed in claim 33 including the steps of using CCD or CMOS technology in said two dimensional detector array, creating a preview image histogram of said portion of said specimen being scanned, using the preview image histogram to perform dynamic range contraction and other image processing operations, if required, on the data from said two dimensional detector array during scanning to contract a dynamic range of the image data file after scanning is complete, performing the same contraction on stored images of scanned strips before the final image is assembled.

47. The method as claimed in claim 33 wherein the specimen holder is a movable stage, the method including the steps of moving the stage relative to the two dimensional detector array in a direction perpendicular to the edge dimension of the detector array while the detector array remains fixed.

48. The method as claimed in claim 47 including the step of moving the stage at a constant velocity relative to the two-dimensional detector array.

49. The method as claimed in claim 33 including the steps of moving an optical train, including the detector array, laterally in a direction that is perpendicular to the edge dimension of the detector array and parallel to a plane through the holder and perpendicular to the optical train of the instrument, while the detector holder remains fixed.

50. The method as claimed in claim 49 including the step of moving the optical train laterally at a constant speed.

51. An instrument for alternatively scanning and stationary imaging of at least part of a specimen in combination, the instrument comprising an optical train to focus light from the specimen onto a two-dimensional area detector array, the detector array being part of the optical train, there being a holder for the specimen, the holder moving relative to the detector array during scanning by successive distances of MX on the detector array and corresponding successive distances of MY on the specimen, the holder being perpendicular to the optical train of the instrument during scanning, the detector array taking image strips of the specimen, there being a sufficient number of image strips taken to enable the specimen to be at least partially scanned so that each part of the specimen being scanned is exposed to the detector array N/M times resulting in N/M overlapping area images being taken for each part of the specimen being scanned, a processor being programmed to add together data for all N/M exposures for each line in the image strip for each part of said specimen being scanned and to assemble the resulting image strips for all parts of the specimen being scanned in order to produce a contiguous image of said portion of said specimen being scanned, where N is the number of lines of said detector array and is greater than 1, X is the distance between lines of the detector array, Y is the distance on the specimen corresponding to the distance on the detector array during scanning and M is a positive integer, the holder being fixed relative to the detector array during stationary imaging of the specimen.

52. The instrument as claimed in claim 51 wherein the detector array has a shutter, the detector array being configured to receive data from the specimen when the shutter is open and to pass data from the detector array to a processor when the shutter is closed, the scanning images being images taken during scanning being added together by a processor to produce a contiguous image of at least part of said specimen being scanned.

53. The instrument as claimed in claim 52 wherein increased optical resolution can be achieved in the single field of view images using structured illumination.

54. The instrument as claimed in claim 53 wherein the specimen is illuminated by speckle when the diffuser plate is stationary and a second uniform-illumination image when the diffuser plate is in rapid motion, the two images being processed and combined to produce a final optically-sectioned high resolution image.

55. The instrument as claimed in claim 51 wherein stationary images, being images taken when the holder is fixed relative to the detector array are single field of view images.

56. The instrument as claimed in claim 55 wherein the stationary images are taken to provide video array acquisition for viewing in real time.

57. The instrument as claimed in claim 51 wherein the stationary images, being single field of view images taken when the holder is fixed relative to the detector array are either brightfield or fluorescence images.

58. The instrument as claimed in claim 57 wherein increased exposure of single field of view fluorescence images can be accomplished by increasing a time that the shutter is open or by adding a serious of images of the same field of view, which allows a dynamic range in the image to be larger than that of the detector array.

59. An instrument for scanning at least a part of a specimen, the instrument comprising an optical train to focus light from the specimen onto a two-dimensional area detector array, the detector array being part of the optical train, there being a holder for the specimen, the specimen moving with the holder, the holder moving relative to the detector array during scanning by successive distances of MX on the detector array and corresponding successive distances of MY on the specimen, the holder being perpendicular to the optical train of the instrument during scanning, the detector array taking image strips of the specimen, there being a sufficient number of image strips taken to enable the specimen to be at least partially scanned so that each part of the specimen being scanned is exposed to the detector array N/M times resulting in N/M overlapping area images being taken for each part of the specimen being scanned, a processor being programmed to add together data for all N/M exposures for each line in the image strip for each part of said specimen being scanned and to assemble the resulting image strips for all parts of the specimen being scanned in order to produce a contiguous image of said portion of said specimen being scanned, where N is the number of lines of said detector array and is greater than 1, X is the distance between lines of the detector array, Y is the distance on the specimen corresponding to the distance on the detector array during scanning and M is a positive integer.

* * * * *